United States Patent

Muhlhoff

[11] Patent Number: 5,836,366
[45] Date of Patent: Nov. 17, 1998

[54] METHOD OF FITTING AN ASSEMBLY FORMED OF A TIRE AND OF A TREAD STRIP SUPPORT

[75] Inventor: Olivier Muhlhoff, Clermont-Ferrand, France

[73] Assignee: Compagnie Generale des Etablissements Michelin-Michelin & Cie, Clermont-Ferrand, France

[21] Appl. No.: 750,303

[22] PCT Filed: May 23, 1995

[86] PCT No.: PCT/EP95/01954

§ 371 Date: Dec. 5, 1996

§ 102(e) Date: Dec. 5, 1996

[87] PCT Pub. No.: WO95/33628

PCT Pub. Date: Dec. 14, 1995

[30] Foreign Application Priority Data

Jun. 9, 1994 [FR] France ..................................... 94 07164

[51] Int. Cl.⁶ ...................................................... B60B 21/00
[52] U.S. Cl. ..................................... 152/379.3; 152/381.4; 152/520
[58] Field of Search ............................... 152/379.3, 379.4, 152/379.5, 381.3, 381.4, 381.5, 381.6, 399, 400, 401, 157, 158, 516, 521

[56] References Cited

U.S. PATENT DOCUMENTS

| | | |
|---|---|---|
| 1,944,767 | 1/1934 | Stevens . |
| 2,347,622 | 4/1944 | Tschanz ........................... 152/381.3 X |
| 3,930,527 | 1/1976 | French ............................ 152/379.4 X |
| 4,212,338 | 7/1980 | Tiemann . |
| 5,495,881 | 3/1996 | Girard ................................ 152/400 X |
| 5,634,993 | 6/1997 | Drieux et al. ..................... 152/381.4 X |
| 5,690,762 | 11/1997 | Bock et al. ......................... 152/158 X |

FOREIGN PATENT DOCUMENTS

| | | |
|---|---|---|
| 2560121 | 8/1985 | France . |
| 3809422 | 10/1989 | Germany ............................ 152/379.3 |
| 605186 | 9/1978 | Switzerland ........................... 152/520 |

Primary Examiner—Russell D. Stormer
Attorney, Agent, or Firm—Baker & Botts

[57] ABSTRACT

A method of fitting a tire and support ring on a one-piece wheel rim in which the rim includes a first wheel rim seating surface and a second wheel rim seating surface, the first wheel rim seating surface tapering outwardly and having a small hump at the axially outer end and being connected axially on the inside to a cylindrical portion intended to receive a tread support ring, the tire having a first bead and a second bead to be fitted, respectively, on the first wheel rim seating surface and the second wheel rim seating surface, and in which the removable support ring is inserted into the tire before fitting the support ring on the wheel rim.

11 Claims, 4 Drawing Sheets

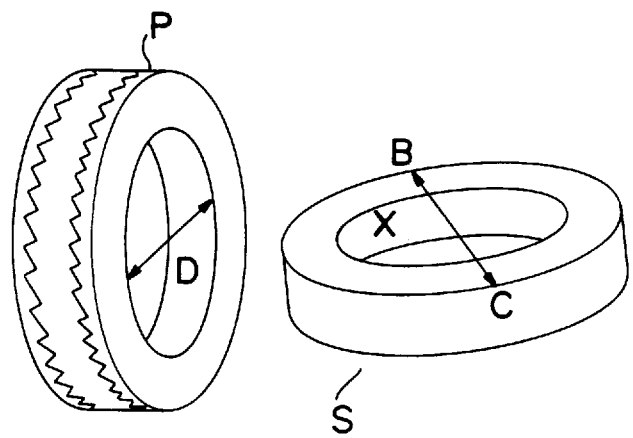
FIG. IA
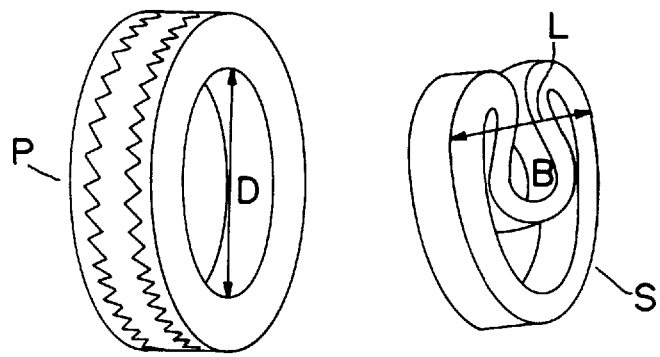
FIG. IB
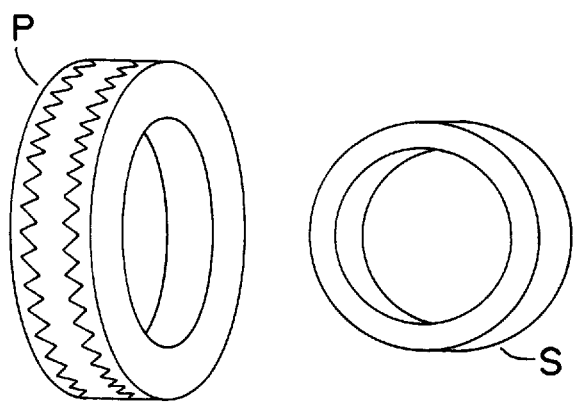
FIG. IC

METHOD OF FITTING AN ASSEMBLY FORMED OF A TIRE AND OF A TREAD STRIP SUPPORT

BACKGROUND OF THE INVENTION

The subject of the present invention is a method of fitting, on a wheel rim which is in service, an assembly formed, on the one hand, by a radial tire and, on the other hand, by a removable ring for supporting the tread, and more particularly an assembly intended on be fitted on a one-piece wheel rim, at least one of the seating surfaces of which is tapered outwardly.

As described in unpublished French applications FR 92/15061, FR 93/14702 and FR 93/14703, a rolling assembly which exhibits high performance when running at low pressure or even at no pressure includes a rim having, in section through the middle, a first seating surface, the axially outer end of which is on a circle of diameter smaller than the diameter of the circle on which the axially inner end is located (such a seating surface is said to taper outwardly), a bearing surface intended to receive a removable ring for supporting the tread, possibly a well, and a second seating surface which is either identical to or different than the first seating surface, together with a tire of appropriate carcass reinforcement meridian profile having beads of appropriate shapes and a removable support ring.

The nominal diameters of these seating surfaces may be equal, but they are preferably unequal.

French Application FR 92/15061 describes a method of fitting a tire to a wheel rim of the type in question. Said method consists first of all in fitting one bead on the rim and sliding it as far as the well, then inserting the support ring, which is removable and rubbery, in the ovalized state and then sliding it on the cylindrical bearing surface provided for this purpose.

This method limits the axial width of the support, and it is not very easy to carry out in garages equipped with conventional tooling.

SUMMARY OF THE INVENTION

In order to overcome such drawbacks and improve the ease with which the tire, having a first bead and a second bead, and the removable support ring are mounted on a one-piece wheel rim comprising a first wheel rim seating surface and a second wheel rim seating surface, at least the first wheel rim seating surface tapering outwardly, extended axially on the outside by a small hump, and connected axially on the inside to a bearing surface intended to receive the tread support ring, the second wheel rim seating surface having its axially inner end on a circle of diameter greater than the diameter of the circle on which the axially inner end of the first wheel rim seating surface is located, the method of fitting, in accordance with the invention, comprising:

first of all, inserting the support ring inside the tire,
then placing the second bead onto the wheel rim from the side opposite to the second wheel rim seating surface, then moving it on the wheel rim bearing surface using positioning means,
fitting the first bead on the first wheel rim seating surface, and
then carrying out the remaining stages of fitting the tire on the wheel rim.

The fitting of a tire on a wheel rim always begins by placing the tire on one side of the wheel rim and, by convention of language, the bead placed first on the rim is referred to as the second bead, that is to say, the bead which will be mounted on the wheel rim seating surface situated on the side opposite to the side from which mounting is begun, said wheel rim seating surface being the second wheel rim seating surface.

Before it is inserted into the tire, the support ring has to be in a form which allows its insertion; thus the support may be ovalized such that the short axis of the oval obtained after deformation is smaller than the diameter of the tire bead seating surface over which the support has to pass; it may be puckered so that the maximum distance between two of its points is less than the diameter of said tire bead; it may retain its initial shape, it then being necessary to deform said tire bead.

The means for positioning the bead vary depending on the shape of the wheel rim in service and depending on the axial width of the support. If the nominal diameter of the second wheel rim seating surface is equal to the nominal diameter of the first wheel rim seating surface, then the wheel rim generally has a well, and placing the second tire bead onto the wheel rim and moving it along the wheel rim bearing surface, which, for example, is cylindrical, requires mechanical means, such as known tire levers, rollers applied to the beads, or a tire press. By contrast, if the nominal diameter of the second wheel rim seating surface is greater than that of the first seating surface, and in cases where the support has a width which is smaller than the axial distance separating the two beads after fitting, then the means for positioning the second bead may be reduced simply to pressing it in the axial direction of the tire/support assembly.

Irrespective of the type of wheel rim considered in the present invention, in order to make it easier to position the first bead on the first wheel rim seating surface, it is advantageous to place a circular metal ring with a frusto-conical radially outer generatrix adjacent and axially on the outside of said first seating surface.

DESCRIPTION OF THE DRAWINGS

The invention is illustrated by the drawings attached to the description, showing the various stages of fitting on several wheel rims, in which drawings:

FIGS. 1A to 1C diagrammatically represent the stage which is common to the various types of fitting irrespective of the wheel rim, and illustrating three possible shapes of the support before insertion, FIGS. 2A to 2D diagrammatically represent the subsequent stages in the case of a wheel rim according to a first embodiment, FIGS. 3A to 3C diagrammatically represent the subsequent stages in the case of a wheel rim according to a second embodiment, FIGS. 4A and 4B, still diagrammatically, represent the same stages in the case of a wheel rim according to another embodiment.

DESCRIPTION OF PREFERRED EMBODIMENTS

Figure 2A:
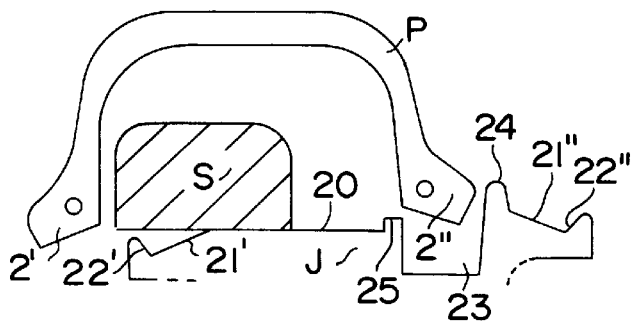
Figure 2B:
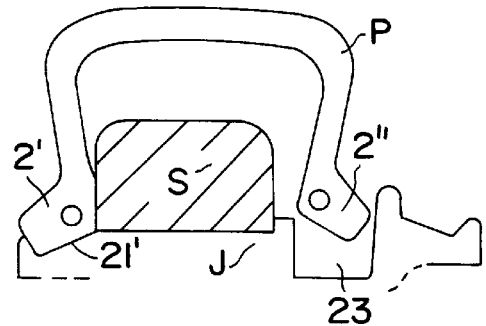
Figure 2C:
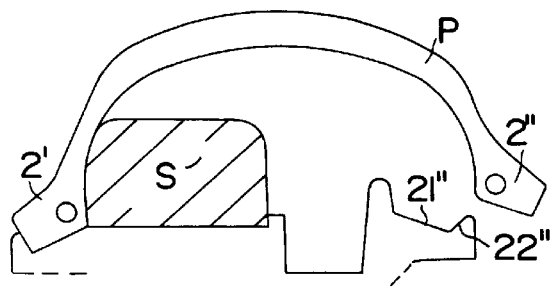

Shown in FIGS. 1A to 1C is the first operation, in accordance with the invention, of fitting, on the wheel rim in question, a tire P which has a construction, particularly as regards the beads, suited for fitting on the wheel rim. The support ring S is inserted into the tire P. In the case of FIG.

1A, the support ring S has been ovalized beforehand by pressure at two points B, and C which are radially on the outside and diametrically opposed, so that the distance X separating said two points is smaller than the initial outside diameter of the support ring and smaller than the diameter D of the seating surface for the bead of the tire P. The support ring is thus inserted inside the tire P at right angles to the plane of the bead wires. In the case of FIG. 1B, the support ring S, before being inserted into the tire P, is puckered by pressure at a single point B on its outside circumference so that approximately half the support is folded in its own plane into the other half, which makes it possible to achieve a maximum straight-line distance L between two points on the outside circumference of the support which is smaller than the diameter D of the seating surface for the bead of the tire P. Insertion into the tire P then takes place parallel to the plane of the bead wires. It is clear that in the two examples described hereinabove, the support ring S has to be made of a material which allows the deformations described; it is therefore advantageously made of a vulcanizable elastomeric material. It is possible to use a support ring S made of a more rigid material, particularly a plastic material. Figure 1C shows how the support ring is inserted into the tire P: the support ring S is placed at right angles to the plane containing the beads wires and the support ring is inserted into the tire after said bead wires and the beads which contain them have been ovalized.

In FIGS. 2A to 2D, the wheel rim J comprises, on each side of its equatorial plane, and in section through the middle, a first wheel rim seating surface 21' and a second wheel rim seating surface 21" which taper outwardly, that is to say, the axially outer ends of the seating surfaces are on circles with diameters smaller than the diameters of the circles on which the axially inner ends are to be located, these two seating surfaces 21' and 21" having small humps 22' and 22" at their axially outer ends which are intended to retain the beads. The first seating surface 21' is joined axially on the inside to a cylindrical portion 20 of the wheel rim, this portion being intended to receive the support ring S, for example made of a vulcanized rubbery compound, while the second wheel rim seating surface 21" is joined axially on the inside to a wheel rim flange 24. Said flange 24 together with the cylindrical portion 20 provided with a positioning hump 25 on its axially inner end define a well 23. The two wheel rim seating surfaces 21' and 21" in the nonlimiting example described have unequal diameters, the diameter of the axially inner end of the seating surface 21" being slightly greater than the diameter of the axially inner diameter of the seating surface 21', the difference being 16 mm.

Figure 2D:
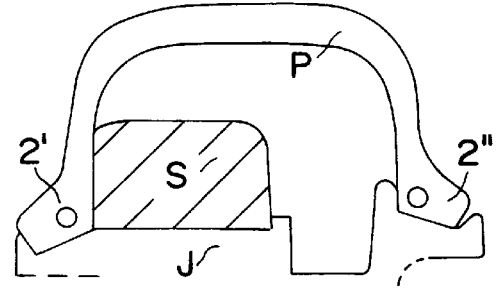

After the support ring S has been inserted into the tire P, the assembly thus formed is fitted on the wheel rim J by placing the second bead 2" on the rim from the side opposite to the side having the wheel rim flange 24, the position shown in the diagram of FIG. 2A, in which the second bead is in the well 23. Next, the first bead 2' of the tire P is fitted onto its seating surface 21' (FIG. 2B), for example, by using tire levers, the second bead 2" still being in the well 23. Fitting is then completed by raising the second bead 2" out of the well and moving it axially over the outside of the hump 22" bordering the second wheel rim seating surface 21' (FIG. 2C), then by placing said second bead 2" on its wheel rim seating surface 21" so that the tire P, the wheel rim J and the support ring S are assembled as shown in FIG. 2D. The fitting operation is then completed by inflating the assembly.

Figure 4A:
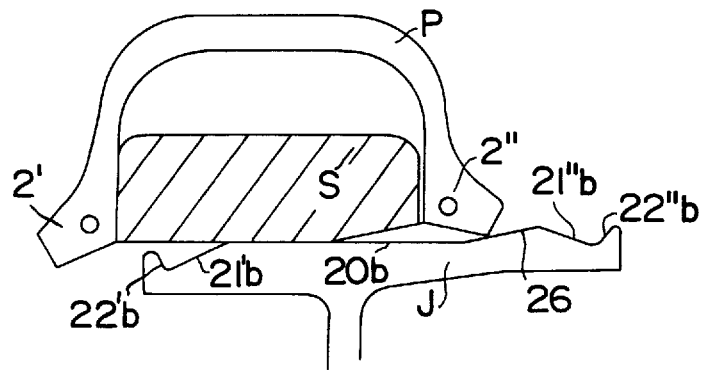
Figure 4B:
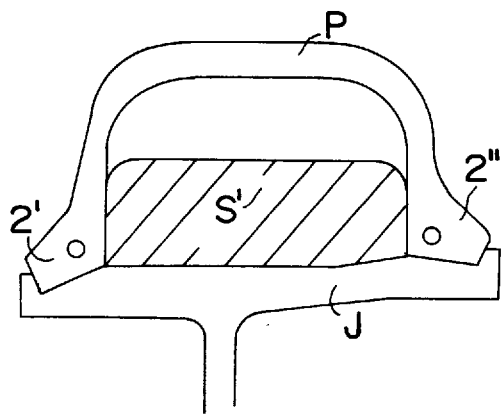

Another alternative form in accordance with the invention is illustrated in FIGS. 4A and 4B. This deals with fitting on a wheel rim J of the type in question, but the rim has neither a well nor an axially inner wheel rim flange, it being possible for said wheel rim J to have either two outwardly tapered seating surfaces, or a first outwardly tapered seating surface and a second inwardly tapered or flat seating surface. A wheel rim seating surface is said to taper inwardly when its axially inner end is on a circle of diameter smaller than the diameter of the circle on which its axially outer end is located. A wheel rim seating surface is said to be flat when its generatrix is parallel to the axis of rotation of the wheel rim. The example described deals with fitting on a wheel rim comprising a first outwardly tapered wheel rim seating surface 21', equipped axially on the outside with a hump 22', and a second outwardly tapered wheel rim seating surface 21" equipped axially on the outside with a hump 22". The first seating surface 21' is joined axially on the inside to a cylindrical portion 20. The second seating surface 21", which has an axially inner end on a circle of diameter greater than the diameter of the circle on which the axially inner end of the first wheel rim seating surface 21' is located, is connected axially on the inside by a frustoconical surface 26 forming a connection with the cylindrical portion 20. As in the alternative forms illustrated hereinabove, the first stage in the fitting method consists in inserting the tread support ring S into the tire P, it being possible for said support to be very wide, for example as wide as the axial distance separating the two beads of the tire fitted-on the wheel rim. The second stage consists simply in slipping the assembly thus formed over the cylindrical portion of the wheel rim (FIG. 4A). The third stage consists in fitting the first bead 2' on its seating surface 21' (FIG. 4B) using a press, for example, without concern about the placing of the second bead 2" which is automatically positioned on its wheel rim seating surface. As in all the cases, the last step consists in inflating the tire.

Fitting operations (not shown) the same as those described hereinabove and shown in FIGS. 4A and 4B are possible in the case where the wheel rim for fitting, without a well and having a cylindrical portion 20 of a width equal to the axial distance separating the two beads fitted on the wheel rim, have a second inwardly tapered wheel rim seating surface 21" and the axially inner end of which is on a circle of diameter at least equal to the diameter of the circle on which the axially inner end of the first wheel rim seating surface 21' is located, and a radially extending wheel rim flange of configuration similar to that of known, normal and standardized wheel rim flanges located adjacent the outer end of the second seating surface.

Figure 3A:
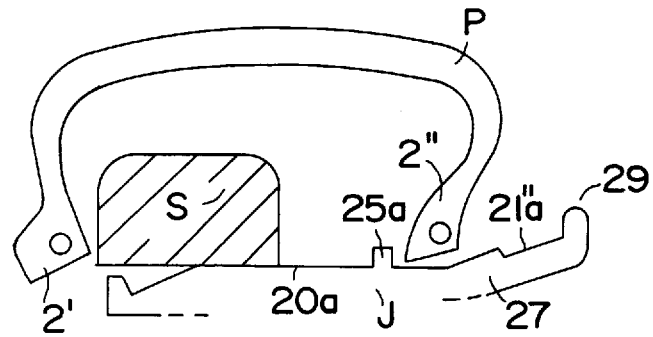
Figure 3B:
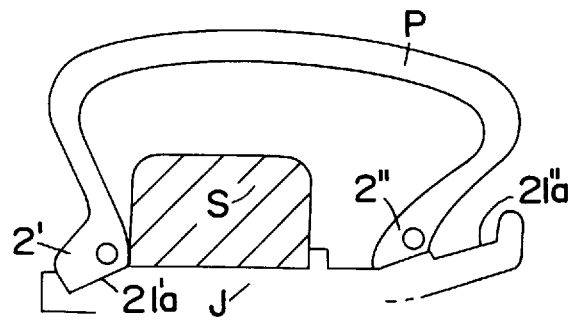
Figure 3C:
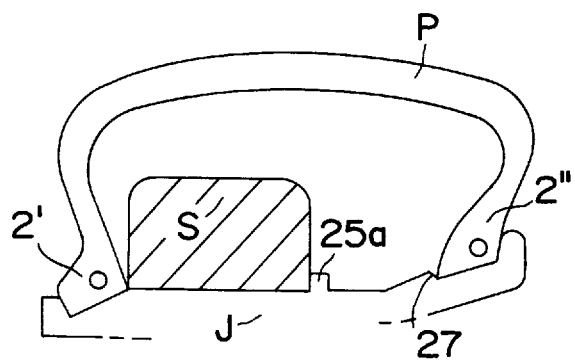

It is possible to use a wheel rim J as shown in FIG. 3 of the unpublished application FR 93/14703, that is to say a wheel rim J of the type in question, which does not have a well and has a cylindrical portion 20 equipped axially on the inside with a projection 25 for positioning the support ring S and with an inwardly tapered second wheel rim seating surface 21". This second wheel rim seating surface 21" is, on the one hand, joined axially on the inside to a projection 27 for retaining the second bead 21' and extended axially on the outside by a conventional wheel rim flange 24. In this case too, after the tread support S has been inserted into the tire P, the assembly is slipped onto the wheel rim J (FIG. 3A) and the first bead 2' is fitted on the first wheel rim seating surface 21' without concern about the position of the second bead 2" (FIG. 3B), the pressurizing of the interior cavity of the tire acting as a device for positioning the second bead, so as to reach the fitted assembly (FIG. 3C).

Figure 5:
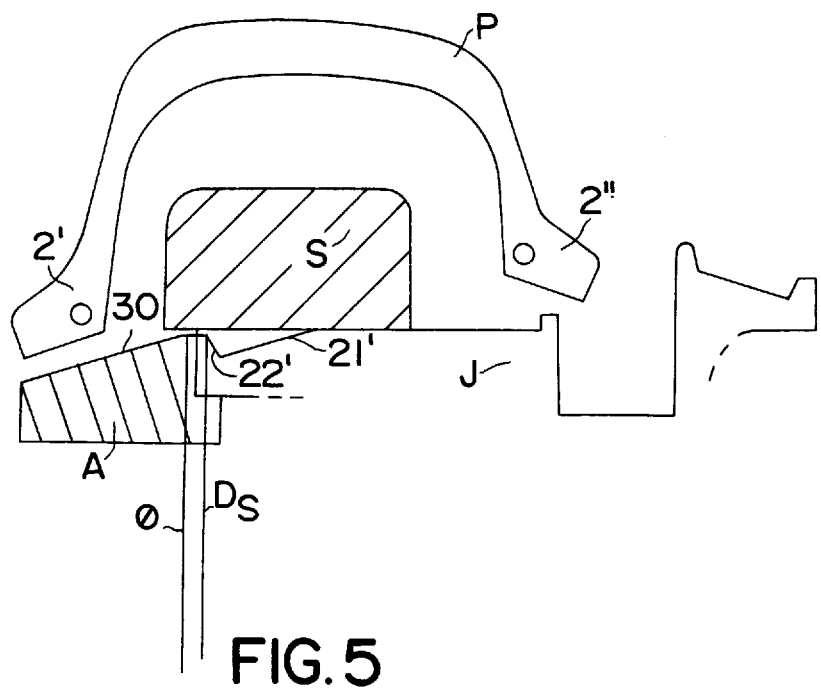
FIG. 5 shows diagrammatically the presence of a circular ring axially on the same side as the first wheel rim seating surface.

FIG. 5 illustrates the possibility of juxtaposing an auxiliary ring A for positioning the first bead 2' on its wheel rim seating surface 21' axially next to the first hump 22' of the wheel rim. This ring A has a transverse section, the radially outer side 30 of which is a frustoconical generatrix. Said frustoconical generatrix 30 has an axially inner end on a circle of diameter ø equal to the maximum diameter Ds of the radially outer face of the axially adjacent hump 22', and an axially outer end of a circle of diameter smaller than ø, so that it makes an angle of between 5° and 20° with the direction parallel to the axis of rotation of the whole. Said removable ring is fixed to the wheel rim J by any known fixing means such as welding, possibly combined with screw-fastening, for example.

As regards the removal of an assembly formed by the tire and the tread support, this presents no difficulties irrespective of the wheel rim used. Pressure on the second bead using appropriate equipment, the amount of pressure depending on the configuration of wheel rim, allows said bead to be dislodged so as to bring it axially to the inside. Dislodging the first bead from its wheel rim seating surface poses no additional problems since in the same way all that is required is for a simple pressure to be exerted on its wall, using simple tools.

What is claimed is:

1. A method of fitting a tire and a tread support ring on a one-piece wheel rim comprising a first wheel rim seating surface, a second wheel rim seating surface, a tread support ring bearing surface connected axially on the inside of the first wheel rim seating surface and a small hump at the outer end of the first wheel rim seating surface, at least the first wheel rim seating surface tapering outwardly and the second wheel rim seating surface having its axially inner end on a circle of a diameter greater than the diameter of the circle on which the axially inner end of the first wheel rim surface is located, the tire comprising a first bead (2') and a second bead (2") which will surface is located, the tire comprising a first bead (2') and a second bead (2") which will be fitted respectively on the first wheel rim seating surface and the second wheel rim seating surface, the method comprising:

in a first stage, inserting the support ring into the tire, placing the second bead (2") onto the wheel rim from the side opposite to the second wheel rim seating surface and moving it over the bearing surface using positioning means, fitting the first bead on the first wheel rim seating surface, the first bead engaging the support ring to seat it on the bearing surface, and then completing the fitting of the second bead on the second wheel rim seating surface.

2. A method according to claim 1, including ovalizing the support ring by pressure at two diametrically opposed points before it is inserted into the tire, said insertion taking place at right angles to the plane of the bead wires on the beads.

3. A method according to claim 1, including puckering the support ring before it is inserted into the tire, said insertion taking place parallel to the plane of the bead wires in the beads.

4. A method according to claim 1, including ovalizing the bead wires of the beads and inserting the support ring into the tire at right angles to the plane of the bead wires.

5. A method according to claim 1 in which the wheel support ring bearing surface is cylindrical and the rim includes a hump for positioning the support ring on the bearing surface, the second wheel rim seating surface is tapered outwardly and the axially inner end is on a circle of diameter greater than the diameter of the circle on which the axially inner end of the first wheel rim seating surface is located and in which the completing of the fitting of the second bead on the second wheel rim seating surface comprises:

displacing the second bead axially beyond the cylindrical bearing surface and radially to the outside of the wheel rim, fitting the second bead on the second wheel rim seating surface, inflating the tire.

6. A method according to claim 5, in which the rim includes at least one well, a radially extending flange between the well and the second seating surface and the method includes inserting the second bead into the well after the second bead has been placed on the wheel rim.

7. A method according to claim 1 in which the fitting of the second bead on the second wheel rim seating surface is completed by selecting a support ring of a width which spans the distance between the beads, pushing the assembly of tire and support ring until the first bead is in position on the first wheel rim seating surface, the second bead positioning itself on the second wheel rim seating surface under the effect of the axial displacement of the support, inflating the tire.

8. A method according to claim 7 in which a hump is provided axially to the outside of the second wheel rim seating surface and a frustoconical surface connects the cylindrical bearing surface and the second wheel rim seating surface.

9. A method of fitting according to claim 7 in which the second wheel rim seating surface has a radially extending flange at the axially outer end and the surface of the second wheel rim seating surface tapers inwardly from the flange.

10. A method according to claim 1, including placing adjacent the hump at the outer end of the first wheel rim seating surface a metal circular ring having, in meridian section, a radially outer surface which is a frustoconical generatrix forming an angle of between 5° and 20° with the direction parallel to the axis of the rim, the axially inner end of which is on a circle of diameter equal to the maximum diameter of the said hump, joining the metal ring to the wheel rim by fastening means, and sliding the assembled tire and support ring along the metal ring onto the rim.

11. A method according to claim 10, including removing the metal ring from the rim when the tire and support ring are fitted on the rim.

* * * * *

UNITED STATES PATENT AND TRADEMARK OFFICE
CERTIFICATE OF CORRECTION

PATENT NO. : 5,836,366

DATED : November 17, 1998

INVENTOR(S) : Olivier Muhlhoff

It is certified that error appears in the above-identified patent and that said Letters Patent is hereby corrected as shown below:

Col. 1, line 13: "FR" should be deleted;

Col. 1, line 14: "92/15061," should be deleted; and "FR 93/14703" should read --FR 93/14703 and U.S. Pat. No. 5,634,993--;

Col. 4, line 13: "21'," should read --21'b,--; and "22'," should read --22'b,--;

Col. 4, line 15: "21"," should read --21"b--; and "22"" should read -- 22"b --;

Col. 4, line 16: "21'" should read --21'b --;

Col. 4, line 17: "20" should read --20b --; and "21"," should read --21"b, --;

Col. 4, line 20: "21'" should read --21'b--;

Col. 4, line 22: "20" should read --20b--;

Col. 4, line 25: "S" should read --S'--;

Col. 4, line 31: "21'" should read --21'b--;

Col. 4, line 39: "20" should read --20b--;

Col. 4, line 42: "21"" should read --21"b--;

Col. 4, line 45: "21'" should read --21'b--;

UNITED STATES PATENT AND TRADEMARK OFFICE
CERTIFICATE OF CORRECTION

PATENT NO.  : 5,83,366

DATED       : November 17, 1998

INVENTOR(S) : Olivier Muhlhoff

<u>Col. 4, line 51</u>: "question which" should read --question, shown in FIGS. 3A and 3B, which --;

<u>Col. 4, line 52</u>: "20" should read --20a--;

<u>Col. 4, line 53</u>: "25" should read --25a--;

<u>Col. 4, line 55</u>: "21′′" should read --21″a--; and "21′′" should read --21″a--;

<u>Col. 4, line 57</u>: "21′′′" should read --21′a--;

<u>Col. 4, line 58</u>: "24." should read --29.--;

<u>Col. 4, line 62</u>: "21′′′" should read --21′a--;

<u>Col. 5, lines 35 and 36</u>: "surface is located, the tire comprising a first bead (2′) and a second bead (2″)which will" should be deleted.

Signed and Sealed this

Fourth Day of April, 2000

Attest:

Q. TODD DICKINSON

*Attesting Officer*    *Director of Patents and Trademarks*